(12) United States Patent
Nicholls et al.

(10) Patent No.: US 6,950,599 B2
(45) Date of Patent: Sep. 27, 2005

(54) OPTICALLY MARKED SURFACE

(75) Inventors: Mark H. Nicholls, Welland (CA);
Sidney O. Nicholls, Fenwick (CA);
Douglas L. Pullin, St. Catharines (CA)

(73) Assignee: Triexe Management Group Inc., Fonthill (CA)

( * ) Notice: Subject to any disclaimer, the term of this patent is extended or adjusted under 35 U.S.C. 154(b) by 0 days.

(21) Appl. No.: 10/643,336

(22) Filed: Aug. 19, 2003

(65) Prior Publication Data

US 2004/0141711 A1 Jul. 22, 2004

Related U.S. Application Data

(62) Division of application No. 09/844,237, filed on Apr. 25, 2001, now Pat. No. 6,672,749.

(51) Int. Cl.$^7$ ................................................. G02B 6/00
(52) U.S. Cl. ........................ 385/147; 385/116; 385/901; 385/120; 362/576
(58) Field of Search .............................. 385/120, 147, 385/115–121; 362/576, 153

(56) References Cited

U.S. PATENT DOCUMENTS

| | | | | |
|---|---|---|---|---|
| 4,310,974 A | * | 1/1982 | Gdovin et al. | 434/42 |
| 4,884,865 A | * | 12/1989 | Grise | 385/115 |
| 6,082,886 A | * | 7/2000 | Stanford | 362/576 |
| 6,116,751 A | * | 9/2000 | Remp | 362/153 |
| 6,398,399 B1 | * | 6/2002 | Neophytou | 362/576 |
| 6,652,132 B1 | * | 11/2003 | Hsueh | 362/567 |
| 2003/0113081 A1 | * | 6/2003 | Melby | 385/120 |

* cited by examiner

Primary Examiner—Frank G. Font
Assistant Examiner—Eric Wong
(74) Attorney, Agent, or Firm—Phillips Lytle LLP

(57) ABSTRACT

Turf comprising artificial or natural turf fibers and fiber optic filaments extending between the turf fibers. The present invention also provides a method of marking a surface comprising the steps of providing a light source, providing a surface to be marked, providing an optical material capable of illumination by the light source, configuring and arranging the optical material, the surface, and the light source such that illumination of the optical material is visible on the surface, and illuminating the optical material. The present invention also provides a method of manufacturing turf comprising the steps of providing a turf surface, providing optical material capable of illumination by a light source, and threading the turf surface with the optical material whereby illumination of the optical material is visible on the surface. The present invention also provides a method of manufacturing a surface comprising the steps of providing an optical material, providing a surface, arranging the optical material such that it extends above the surface, and trimming the optical material such that it is flush with the surface.

6 Claims, 8 Drawing Sheets

OPTICALLY MARKED SURFACE

This is application is a divisional of application(s) application Ser. No. 09/844,237 filed on Apr. 25, 2001 now U.S. Pat. No. 6,672,749.

TECHNICAL FIELD

The present invention relates generally to marked surfacing and, more particularly, to an improved playing surface with optical material which may be illuminated to indicate various markings, such as lines, symbols, emblems, designs or advertising, on the playing surface of sports and athletic facilities.

BACKGROUND ART

A variety of methods have been used in the past to mark the playing surface of sporting events. Different sports require different line markings, team logos, symbols or emblems, and advertising. Such line markings can include, but are not limited to, end zone lines, goal lines, yardage marker lines, boundary lines, creases, midfield lines, base lines, service lines, free throw lines, and circles.

For surfaces such as ice, concrete, or wood, a variety of marking methods have been employed in the prior art. For example, it is known that markings may be painted on the surface and a thin clear coating, such as polyurethane or ice depending on the underlying substrate, then applied to cover and protect the markings. In this type of marking system, the markings are permanent and not easily altered. As a result, such markings cannot be easily hidden or altered to accommodate different sports or activities.

On natural grass and synthetic turf surfaces, it is known that line markings can be indicated by applying a colored substance along the pile of the turf. It is known that such colored substance may be white wash, paint, or lime. Alternatively, it is also known that the line markings may be indicated by filling the turf or pile filaments along the desired lines with particulate material such as chalk, brick dust or sawdust. While a number of these methods are not necessarily permanent, they have the disadvantage of becoming blurred and less distinct with use of the playing field and, as a result, often need to be repeatedly reapplied. In addition, such markings are not easy to remove to accommodate the markings of different sports or activities.

With artificial turf it is also known in the prior art to mark the lines by giving the pile filaments along the desired lines a color which is different from the pile filaments of the adjacent turf material. Thus, the marking lines are made of filaments of a different color from the adjacent material but are otherwise similar to the adjacent material. However, such systems have the disadvantage of being difficult to adjust to accommodate the markings of different sports or activities.

With artificial turf it is also known to separately manufacture strips of material which may be inserted in corresponding gaps cut in the turf field to indicate the line markings. Such line marking strips may be attached by adhesive or loop and hook attachments. However, such systems can often result in a decrease in the durability of the lines and an increase in the labor involved in arranging the strips to accommodate the markings of different sports.

It is also known that a playing field may be marked to simultaneously indicate the lines for more than one sport or activity. However, such dual markings can become confusing to players and officials and can not accommodate the need for showing alternate team logos depending on the team playing or sport being played on the field.

Hence, it would be useful to provide an improved marked surface that may be easily adapted to selectively show on the same playing surface markings for a variety of different sports, teams and advertisements depending on the sport and teams using the particular playing surface.

DISCLOSURE OF THE INVENTION

With parenthetical reference to the corresponding parts, portions or surfaces of the disclosed embodiment, merely for the purposes of illustration and not by way of limitation, the present invention provides an improved optically marked surface (15) comprising a light source (16), a surface to be marked (18), optical material (19) capable of illumination by the light source, the optical material, the surface and the light source being so configured and arranged that illumination of the optical material is visible on the surface.

The light source may emit variable wavelengths of visible light and the optical material may be selectively illuminated at such variable wavelengths. The device may include a second light source wherein the optical material is capable of illumination by the second light source.

The optical material may comprise fiber optic filaments (20, 37) and/or a fiber optical strip (21). The optical material may be selected from a group consisting of glass, plastic and rubber. The fiber optic strip may be selected from a group consisting of side-emitting plastic, side-emitting rubber, and side-emitting glass. The surface may be an athletic playing surface (22), and maybe selected from a group consisting of artificial turf (23), in-filled artificial turf (24), natural grass turf (25), ice, concrete (26), rubber, wood, and tile, or a combination of artificial turf and natural grass turf. The artificial turf may include synthetic turf fibers (27) and fiber optic filaments may extend between such turf fibers. The artificial turf may include turf fibers comprised of the optical material. The optical material may include a fiber optic strip and the fiber optic strip and the turf fibers may be so configured and arranged that illumination of the fiber optic strip causes illumination of the turf fibers.

The optical material may be so configured and arranged as to indicate the line markings of a playing surface for a first sport (35) when selectively illuminated, may be so configured and arranged as to indicate the line markings of a playing surface for a second sport (36) when selectively illuminated, and may be so configured and arranged as to indicate the line markings for the second sport without indicating the line markings for the first sport when selectively illuminated. The light source may emit light at a first wavelength or a second wavelength and the line markings for the first sport may be illuminated at the first wavelength and the line markings for the second sport may be illuminated at the second wavelength. The device may further comprise a second light source and the line markings for the first sport may be illuminated by the first light source and the line markings for the second sport may be illuminated by the second light source. The optical material maybe so configured and arranged as to indicate a team symbol (38) and/or an advertising logo (39) when illuminated.

The artificial turf may include a primary backing layer (30), the optical material may include fiber optic filaments, and the filaments may pass through the primary backing layer. The artificial turf may include a secondary backing layer (33) and a base layer (34) and the fiber optic filaments may pass through the secondary backing layer and between the secondary backing layer and the base layer to communicate with the light source.

Also disclosed is turf comprising artificial turf fibers and fiber optic filaments extending between the artificial turf fibers.

Also disclosed is turf comprising natural grass fibers and fiber optic filaments extending between the natural grass fibers.

The present invention also provides a method of marking a surface comprising the steps of providing a light source, providing a surface to be marked, providing an optical material capable of illumination by the light source, configuring and arranging the optical material, the surface, and the light source such that illumination of the optical material is visible on the surface, and illuminating the optical material.

The present invention also provides a method of manufacturing artificial turf comprising the steps of providing a primary backing layer, providing artificial fibers, providing fiber optic material, threading the artificial fibers through the primary backing layer, and threading the fiber optic material through the primary backing layer and between the artificial fibers. The primary backing layer may be orientated in a first direction and the artificial fibers may be orientated in a direction substantially transverse to the first direction.

The present invention also provides a method of manufacturing turf comprising the steps of providing a turf surface, providing optical material capable of illumination by a light source, and threading the turf surface with the optical material whereby illumination of the optical material is visible on the surface. The optical material may be threaded during initial manufacture of the turf or after the turf has be placed as surfacing for a playing surface.

The present invention also provides a method of manufacturing a surface comprising the steps of providing an optical material, providing a surface, arranging the optical material such that it extends above the surface, and trimming the optical material such that it is flush with the surface. The surface may be concrete or ice. The method may further include the step of arranging the optical material such that it extends above the surface when the surface is in a substantially liquid form and allowing the surface to harden. The method may further include the step of adding a layer of substance on top of the surface, and the layer may be of the same substance as the surface.

Accordingly, the general object of the present invention is to provide an improved surface which may be marked by the illumination of optical material such that the markings are visible on the surface.

Another object is to provide an improved surface which may be marked with variable wavelengths of visible light.

Another object is to provide an improved surface which may be selectively marked to show the line markings for different sports.

Another object is to provide an improved surface which may be selectively marked to display advertising.

Another object is to provide an improved surface which may be selectively marked to show team emblems or logos.

Another object is to provide an improved surface which may be selectively illuminated to show playing field markings such as boundary lines, yardage lines, midfield lines, goal lines, free-throw lines, base lines, service lines, service boxes, circles, hash marks, creases, auxiliary markings, or any other surface marking used in any sport or leisure activity.

Another object is to provide an improved surface in which markings may be selectively turned on or off.

Another object is to provide an improved surface which may be marked and comprises in-filled artificial turf, natural grass turf, ice, concrete, rubber, wood, tile, or a combination of artificial turf and natural grass turf.

Another object is to provide an improved surface which is marked by fiber optic filaments and/or at least one fiber optic strip which may be selectively illuminated by at least one light source.

Another object is to provide an improved surface in which artificial turf fibers provide both the playing surface and the optical material which is selectively illuminated.

Another object is to provide improved artificial turf which includes fiber optic filaments extending between the artificial turf fibers.

Another object is to provide improved natural turf which includes fiber optic filaments extending between the natural grass fibers.

Another object is to provide an improved surface in which paint, lime or similar marking systems are not necessary.

Another object is to provide an improved surface in which only line markings for a single sport are visible at any one time.

Another object is to provide an improved method of marking a surface which uses optical illumination to show markings on the surface.

Another object is to provide an improved method of manufacturing artificial turf which includes fiber optic material.

Another object is to provide an improved method of installing fiber optical material in existing artificial turf or natural turf surfaces.

Another object is to provide an improved method of altering turf by threading fiber optic filaments into the turf.

Another object is to provide an improved method of manufacturing artificial turf in which fiber optic fibers are threaded or otherwise inserted into the turf during the initial manufacturing of the artificial turf surface.

Another object is to provide an improved method of manufacturing artificial turf in which fiber optic fibers are threaded or otherwise inserted into the artificial turf after the artificial turf surface has been formed.

Another object is to provide an improved method of manufacturing natural grass turf in which fiber optic fibers may be sewn, stitched or punched into a roll or bundle of natural grass sod.

Another object is to provide an improved method of imbedding optical material into the surface of a flooring system such that the optical material may be illuminated.

These and other objects and advantages will become apparent from the foregoing and ongoing written specification, the drawings, and the appended claims.

DESCRIPTION OF THE PREFERRED EMBODIMENTS

Figure 1:
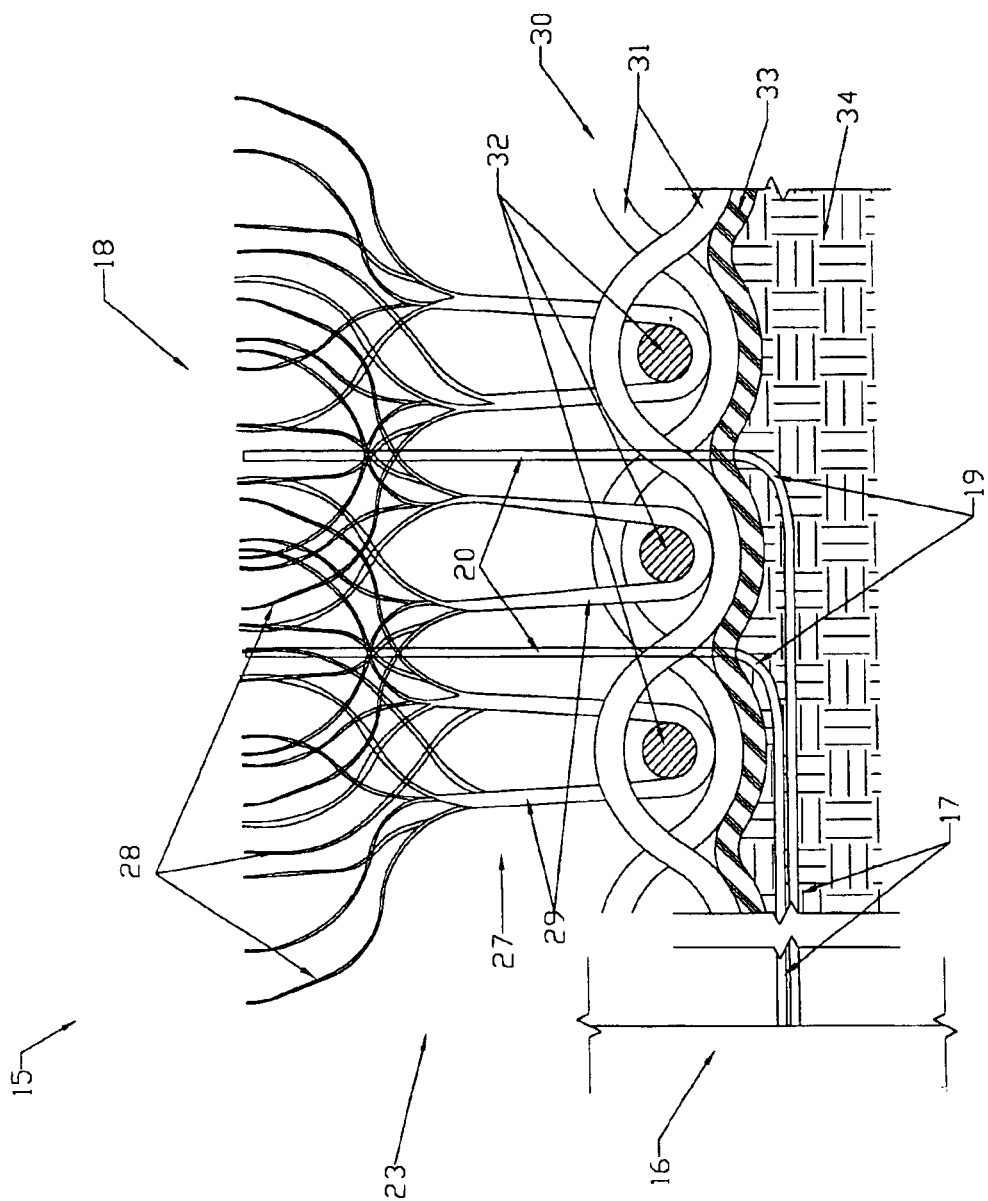
FIG. 1 is a vertical sectional view of a first embodiment of the optically marked surface.

At the outset, it should be clearly understood that like reference numerals are intended to identify the same structural elements, portions or surfaces, consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings and, more particularly, to FIG. 1 thereof, this invention provides an improved optically marked surface, of which the first presently preferred embodiment is generally indicated at 15. In this embodiment, optically marked surface 15 includes a light source 16, a surface material 18, and optical material 19.

In the preferred embodiment, light source 16 is a conventional illuminator with a halogen or metal halide bulb. The Model 701, 400 watt metal halide bulb with a dichric color wheel manufactured by FiberStars Inc. of 44259 Nobel Dr., Fremont, Calif. 94538 may be employed in the preferred embodiment. Light source 16 is located outside or below the playing surface in a suitable location so as not to cause disruption in the playing surface.

In the preferred embodiment, optical material 19 is comprised of numerous cylindrical strands or filaments, each having a substantially constant cross-sectional diameter. Each strand includes a conveyance portion 17 and a filament portion 20. Conveyance portion 17 is that portion of the strand that conveys light from light source 16 to filament portion 20. Filament portion 20 is that portion of the strand which extends to the top of surface 18 and is generally visible on surface 18. Conveyance portion 17 and filament portion 20 are composed of conventional fiber optic filaments or fibers. The FiberSpots-II FSPT-II optical filaments manufactured by FiberStars Inc. may be employed in the preferred embodiment.

Light source 16 and optical strands 19 are arranged so that light from light source 16 is conveyed through conveyance portion 17 of strand 19 to filament portion 20 of strand 19 such that filament portion 20 is illuminated by the light projected from light source 16.

In the embodiment shown in FIG. 1, surface material 18 is a conventional artificial or synthetic turf system 23 supported by a suitable base layer 34. Artificial turf system 23 is composed of synthetic turf fibers 27, a primary backing layer 30, and a secondary backing layer 33. As shown, each turf fiber 27 includes numerous filament portions 28 which split and extending from both ends of a tufted portion 29. Primary backing layer 30 is supported by secondary backing layer 33. As shown, primary backing layer 30 is a conventional backing with longitudinal weave fibers 31 and cross weave fibers 32. Primary backing layer 30 can be made of jute, craft cord, cotton, or any other woven or non-woven material such as nylon or polypropylene. Secondary backing layer 33 is a conventional backing and typically made of rubber, polyurethane or urethane depending on its application. As shown in FIG. 1, primary backing layer 30, secondary backing layer 33 and base layer 34 extend horizontally. Tufted portion 29 of turf fibers 27 is woven such that the middle of turf fiber 27 loops beneath cross weave fibers 32 and the ends of turf fiber 27, including filament portions 28, extend vertically from primary backing layer 30. Tufted portion 29 is held in place by cross weave fibers 32 of primary backing 30. Synthetic turf fibers 27 are of a substantially uniform length and the top of the filament portions 28 of such fibers define the top of surface 18. Dieter Turf manufactured by Turfstore.com Inc. of 237 Boling Industrial Way, Calhoun, Ga. 30701, may be employed in the preferred embodiment.

Base layer 34 is a conventional base material, such as soil or concrete. Although not shown in this embodiment, it is contemplated that a conventional padding system may be inserted between secondary backing layer 33 and base layer 34 to add cushioning to the playing surface. Such a padding system may be an open cell or closed cell rubber or foam pad, depending on the application.

As shown in FIG. 1, conveyance portion 17 of optical strand 19 extends horizontally from light source 16 through base 34 and beneath secondary backing layer 33. Intermittently in the area to be marked, strands 19 bend upwards and filament portions 20 of strands 19 extend vertically from primary backing layer 30 and between artificial turf fibers 27. Filament portions 20 are of a length substantially the same as artificial turf fibers 27 and thus also define the top of surface 18.

Filament portions 20 are composed of a malleable material which may be bent without breaking from contact with objects on surface 18. Fiber optic strands 19 may vary in size and thickness depending on application. The density or ratio of turf fibers 27 to fiber optic filament portions 20 may also vary depending on the type of application and the amount of illumination desired. Filament portions 20 are suitably positioned so that, when illuminated, they provide the desired markings on surface 18.

Figure 2:
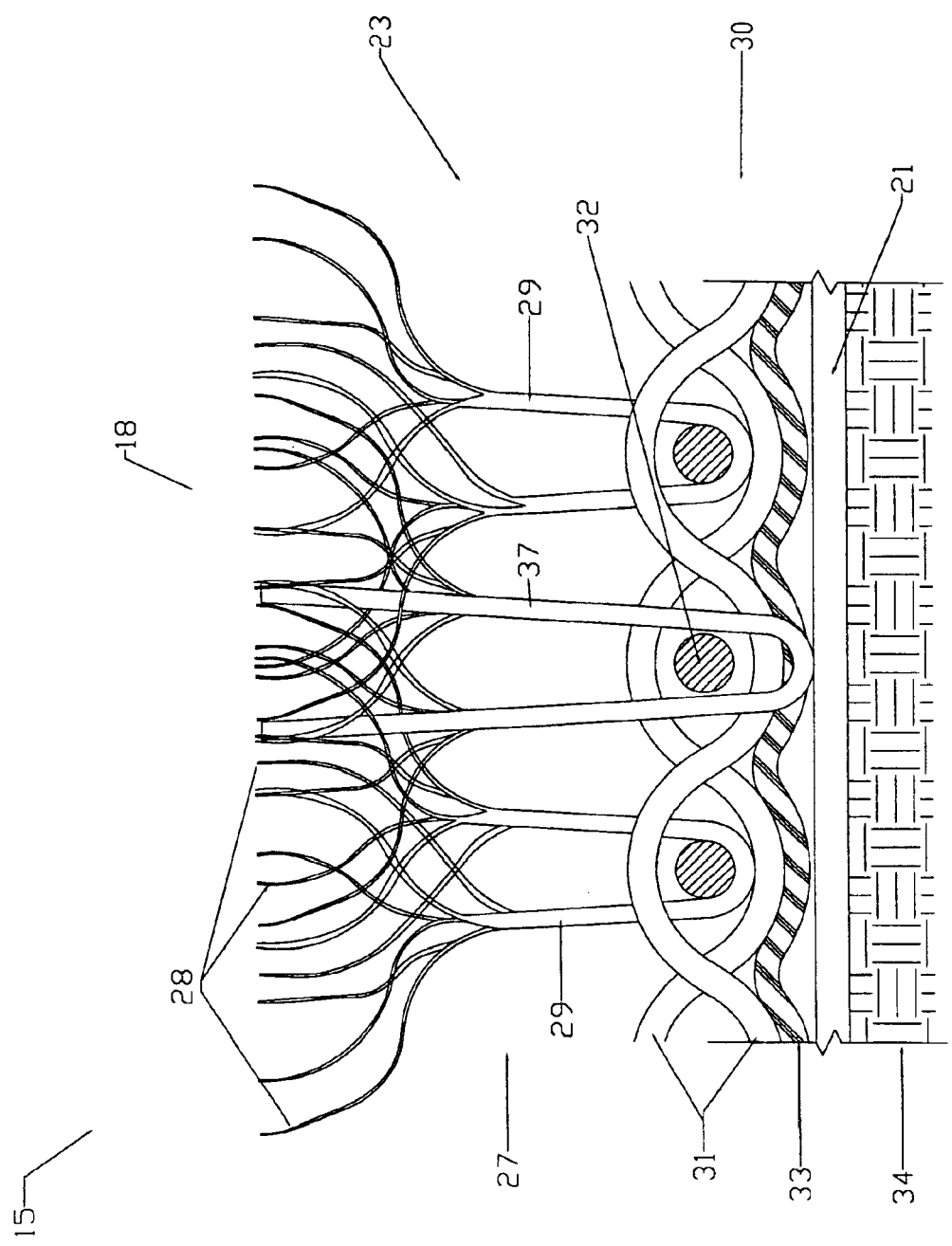
FIG. 2 is a vertical sectional view of a second embodiment of the optically marked surface.

FIG. 2 shows a second embodiment of the optically marked surface. The embodiment shown in FIG. 2 includes an artificial turf system 23 having artificial turf fibers 27, a primary backing layer 30, and secondary backing layer 33 supported by a base layer 34. This embodiment also includes a light source (not shown) and optical material 19. However, in this embodiment optical material 19 comprises a fiber optic strip 21 and fiber optic filaments 37. Rather than conveyance portion 17 linking light source 16 and filament portion 20, a fiber optic strip 21 is inserted horizontally between base layer 34 and secondary backing 33. Fiber optic strip 21 is a conventional flexible translucent side emitting fiber optic strip and may be side-emitting plastic, side-emitting rubber, or side-emitting glass. The PolyGlo side emitting polymer optical strip manufactured by Poly-Optical Products Inc. of 17475 Gillette Avenue, Irvine, Calif. 92614-5633 may be employed in this preferred embodiment.

As shown in FIG. 2, filament 37 communicates with fiber optic strip 21. Light emitting from fiber optic strip 21 is projected through and illuminates fiber optic filament 37. As shown, fiber optic filament 37 is a U-shaped cylindrical strand or filament having a substantially constant cross-sectional diameter. Equal lengths of filament 37 extend vertically from strip 21 a distance substantially equal to the length of turf fibers 27. The middle of filament 37 wraps beneath cross weave fiber 32 of primary backing layer 30 and extends below secondary backing layer 33. Filaments 37 are suitably positioned so that, when illuminated, they provide the desired markings on surface 18. In this second embodiment, filaments 37 are end emitting polymer optic fibers. The Limileen end emitting polymer optic filaments manufactured by Poly-Optical Products Inc. may be employed in this preferred embodiment.

Figure 3:
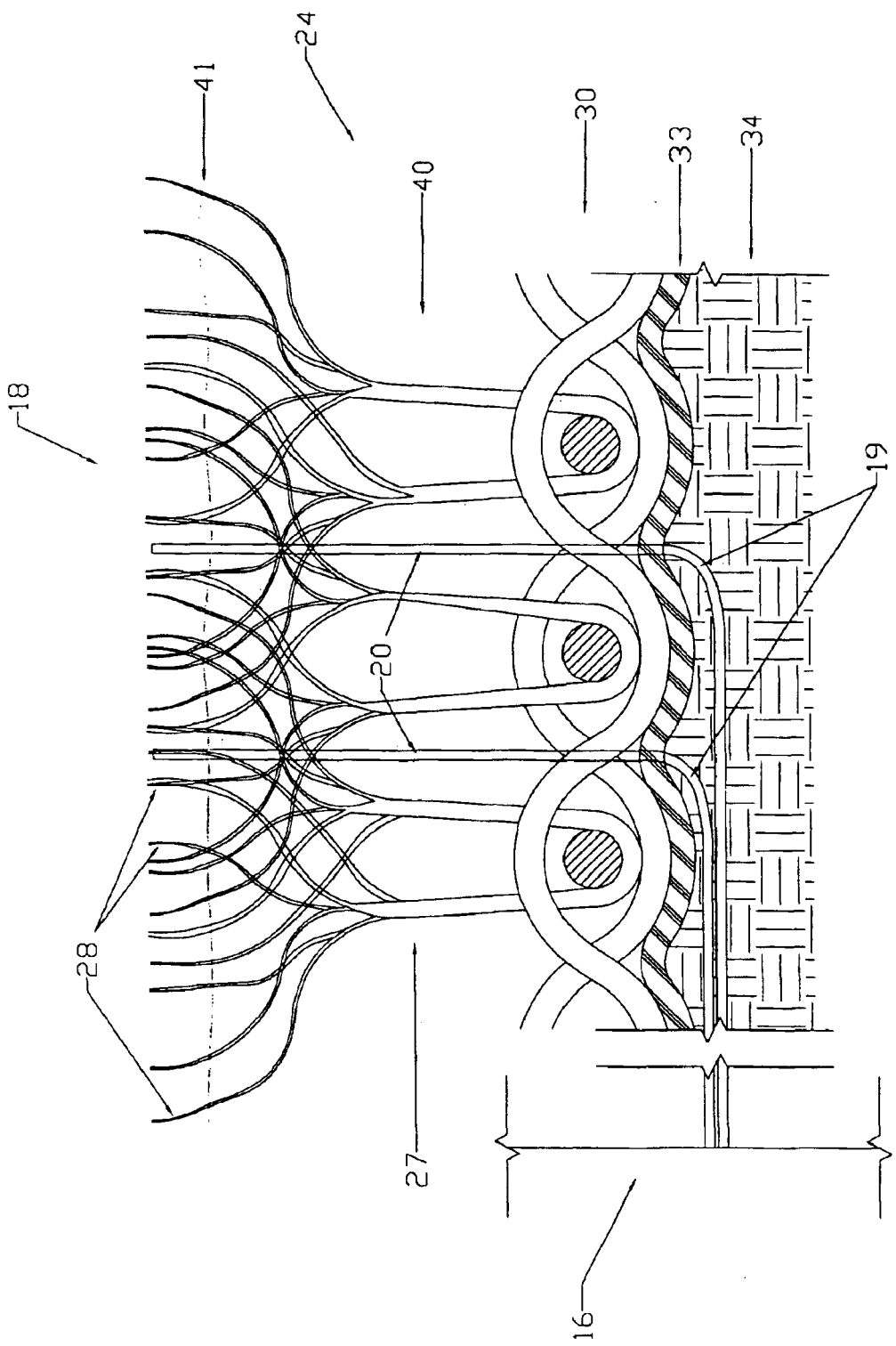
FIG. 3 is a vertical sectional view of a third embodiment of the optically marked surface.

FIG. 3 shows a third embodiment of the optically marked surface. This third embodiment is similar to the embodiment shown and described in FIG. 1. However, in this third embodiment an in-filled artificial turf system 24 is employed in the place of artificial turf system 23. In-filled artificial turf system 24, much like artificial turf system 23, includes synthetic turf fibers 27, primary backing layer 30, and secondary backing layer 33 supported by base layer 34. However, the space between turf fibers 27 is filled with a conventional in-fill material 40. Such in-fill material 40 may include sand and/or granulated rubber. As shown in FIG. 3, in-fill material 40 fills the space between synthetic turf fibers 27 and filament portions 20 of optical strands 19 up to an in-fill height 41. As shown, a portion of filament portions 28 of synthetic turf fibers 27 and filament portions 20 of optical material 19 extend above in-fill height 41. Omni Grass in-filled turf system manufactured by Turfstore.com Inc. may be employed in this embodiment. In-filled turf system 24 is advantageous in that in-fill material 40 adds stability and resilience to surface 18.

Figure 4:
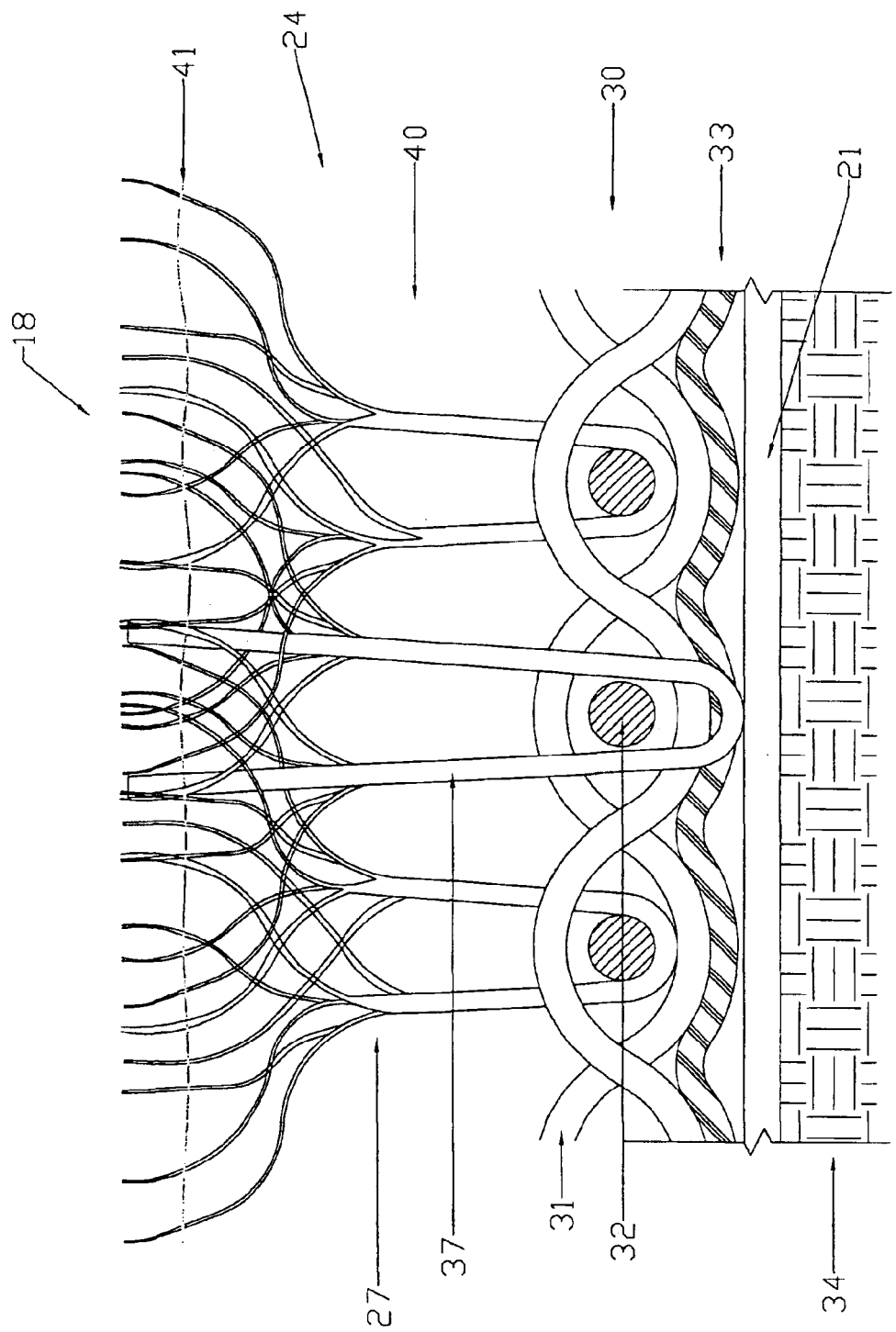
FIG. 4 is a vertical sectional view of a fourth embodiment of the optically marked surface.

FIG. 4 shows a fourth embodiment of the optically marked surface. In this fourth embodiment, in-filled artificial turf system 24 is employed in conjunction with the optical strip 21 and optical filaments 37 described in FIG. 2. Again, the Omni Grass in-filled turf system manufactured by Turfstore.com Inc. may be employed in this embodiment.

Figure 5:
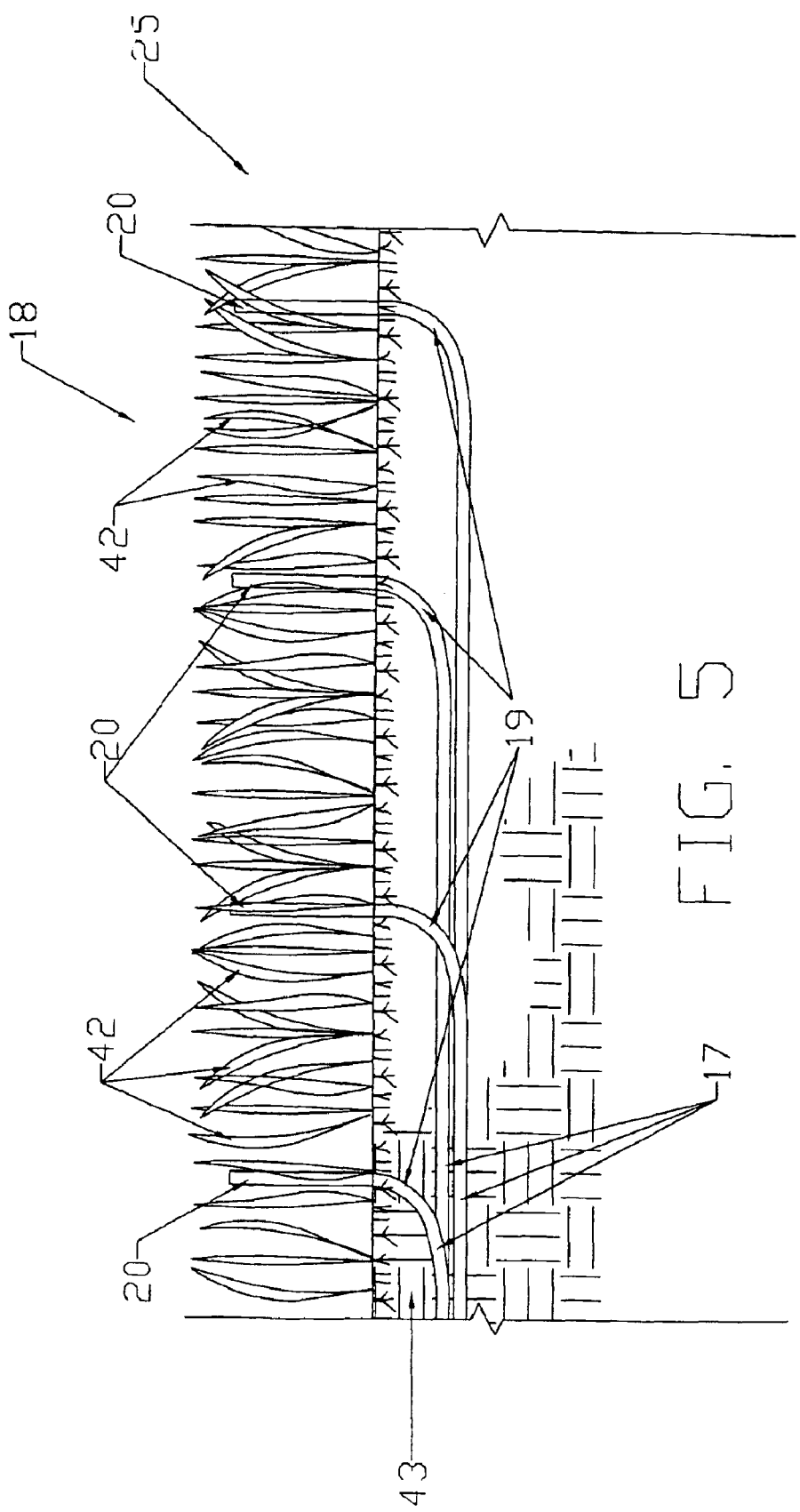
FIG. 5 is a vertical sectional view of a fifth embodiment of the optically marked surface.

FIG. 5 shows a fifth embodiment of the optically marked surface. In this fifth embodiment, surface 18 includes a conventional natural grass turf system 25. As shown, turf system 25 comprises natural blades of grass 42 grow in a soil base layer 43. Base layer 43 may be supported by a subbase layer (not shown). Natural grass fibers 42 extend vertically from horizontal base layer 43. As shown, conveyance portion 17 of optical strands 19 extend horizontally through soil base layer 43. At appropriate intervals in the area to be marked, strands 19 bend upward through soil base layer 43 and filament portions 20 extend vertically from the top of base layer 43 and between natural grass fibers 42. The density or ratio of natural grass fibers 42 to filament portions 20 may vary depending on type of application and the amount of illumination desired.

Figure 6:
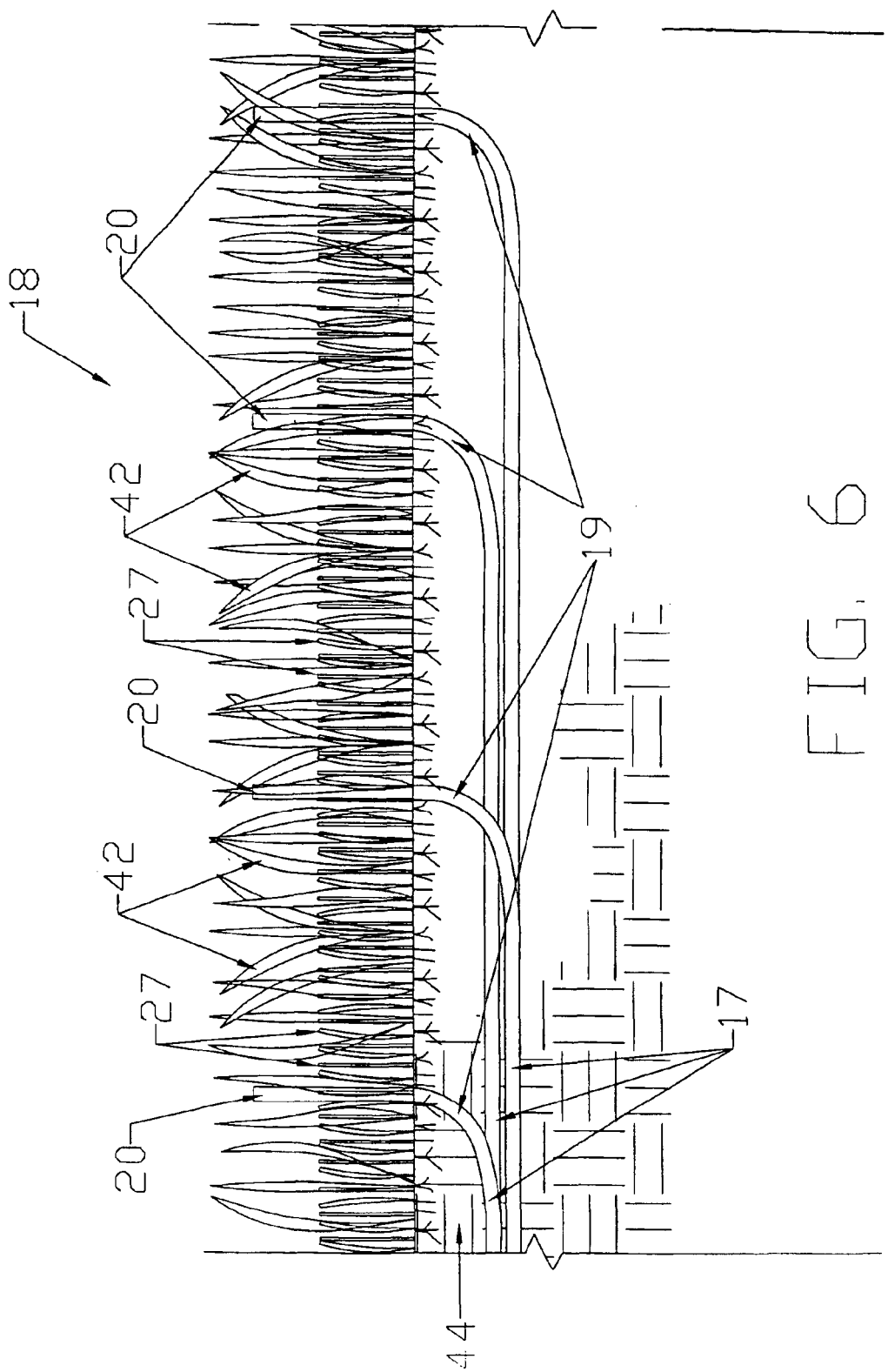
FIG. 6 is a vertical sectional view of a sixth embodiment of the optically marked surface.

FIG. 6 shows a sixth embodiment of the optically marked surface in which a hybrid artificial turf and natural turf system is employed. In this sixth embodiment, both natural grass fibers 42 as well as synthetic turf fibers 27 extend from a hybrid base layer 44. Conveyance portion 17 of optical strands 19 extend horizontally through hybrid base layer 44 and project light to vertically extending filament portions 20. Filament portions 20 are interspersed between artificial fibers 27 and natural grass fibers 42 in the area of surface 18 to be marked. SportGrass hybrid turf manufactured by SportGrass Inc. of 6718 Whittier Ave., Suite 220, McLean, Va. 22101 may be employed in this preferred embodiment.

Figure 7:
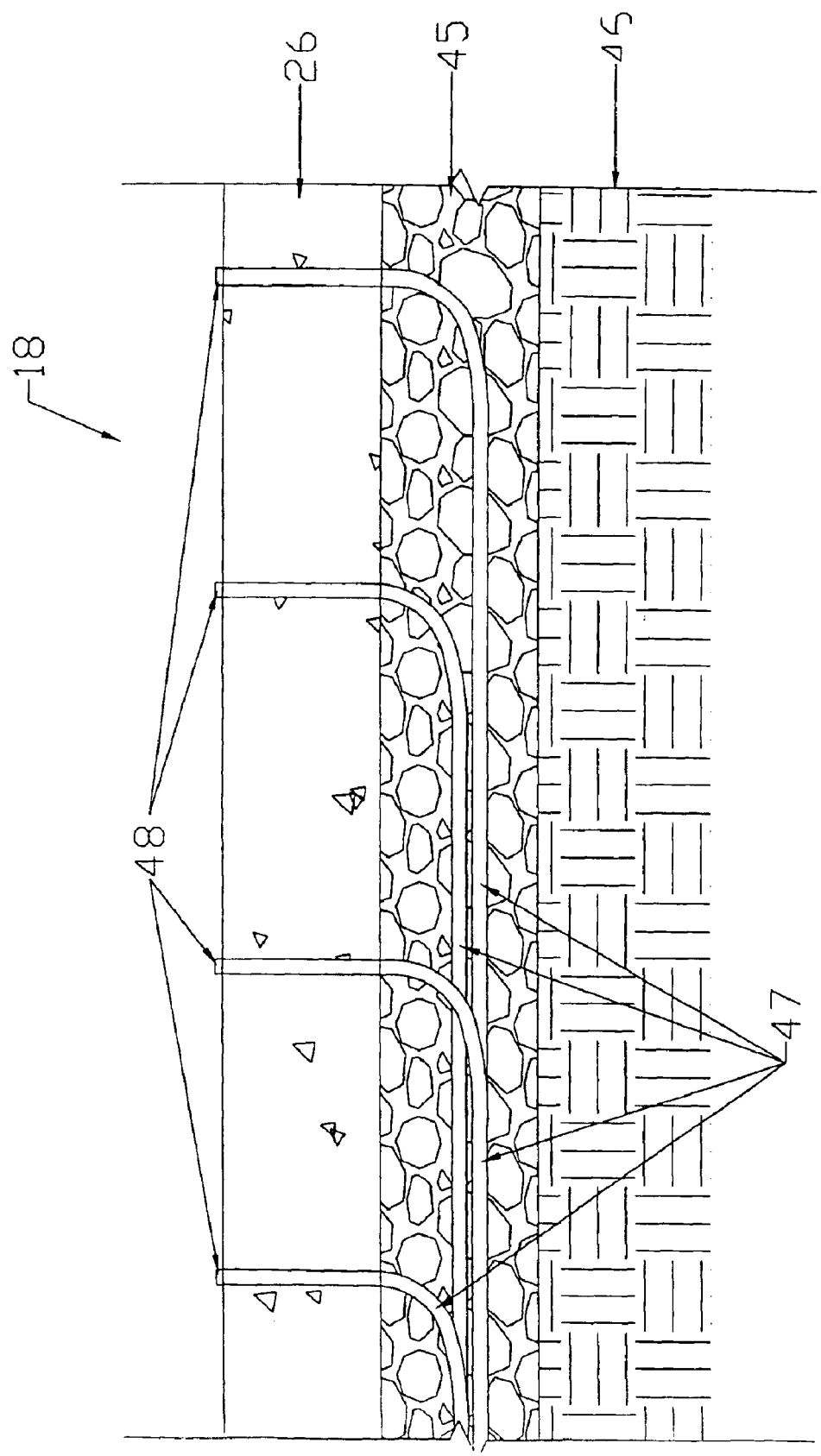
FIG. 7 is a vertical sectional view of a seventh embodiment of the optically marked surface.

FIG. 7 shows a seventh embodiment of the optically marked system. In this embodiment, surface 18 is composed of a concrete layer 26. As shown in FIG. 7, concrete layer 26 is supported by an aggregate base 45 which, in turn, is supported by base layer 46. Optical filaments 47 extend horizontally through aggregate base 45 before bending to extend vertically through concrete layer 26. As shown, end portions 48 of filaments 47 protrude slightly above the top of layer 26 and when illuminated are visible on surface 18 even if layer 26 is not opaque. While this embodiment disclose the use of concrete as first layer 26, it may be readily appreciated that other types of surfacing layers may be used without departing from the invention. For example, other surfaces such as ice, wood, tile, asphalt, or rubber may be used instead of concrete.

Although not shown in the drawings, an eighth embodiment may be employed in which, rather than using fiber optic filaments 37 in conjunction with fiber optic strip 21 as shown and described in the second embodiment, the synthetic turf fibers 27 in the area to be marked are themselves composed of fiber optic material, such that they may be illuminated much like filaments 37. Thus, in the area of surface 18 to be marked, fiber optic strip 21 is placed beneath primary backing 30 such that, when illuminated, strip 21 projects light along and illuminates the synthetic turf fibers directly above strip 21. In this embodiment, the dual optical/turf fibers operate as the illuminating filaments as well as the playing surface.

Figure 8:
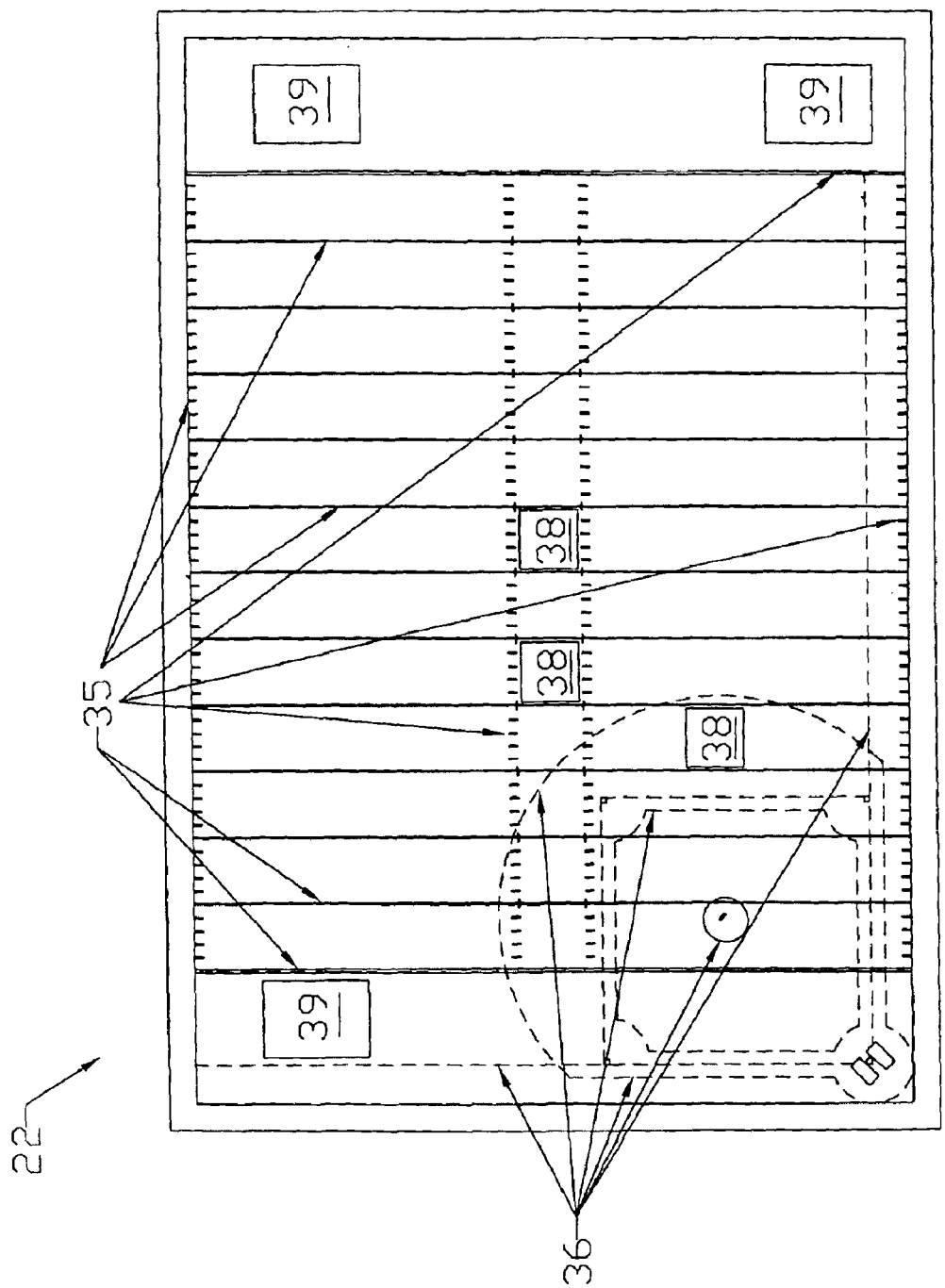
FIG. 8 is a plan view of an embodiment of the optically marked surface.

FIG. 8 shows a plan view of optically marked surface 15. In the embodiment shown in FIG. 8, surface 18 is a playing field that may be used for at least two different sports. Accordingly, surface 18 should have line markings 35 for a first sport and line markings 36 for a second sport. The area on surface 18 of line markings 35 include fiber optic material and surface material configured as shown and described in the first embodiment. Similarly, line markings 36 for a second sport include fiber optic material and surface material as shown and described in the first embodiment. Line markings 35 may be selectively illuminated by energizing at least one light source 16. When the filament portions in the area of the desired line markings 35 are illuminated, line markings 35 appear on the surface 18. However, such optical material may be deilluminated such that line markings 35 are not visible on surface 18. Instead, the filament portions in the area of the desired line markings 36 may be selectively illuminated such that line markings 36 are visible on surface 18 without line markings 35 appearing on surface 18. Such illumination or deillumination may be achieved by turning on or off the corresponding light source or light sources.

In addition, the optical material and light sources may be so configured and arranged that various panel areas 39 maybe illuminated to show advertising for different companies at different times in the same area of the field. In addition, various team emblems or logos 38 may be shown on surface 18 at different times in the same area of the field, depending on the teams on the field or the sport being played.

It should be readily understood that the optical material, surface material, and light sources may be arranged in a myriad of different configurations so as to allow for a variety of alternate markings to be shown at alternate times or places on surface 18. Thus, the number of light sources and the manner in which those light sources are connected to the optical material in surface 18 may be adjusted or designed such that numerous variations of markings may be selectively shown as the user my desire.

It should also be readily understood that by varying the wavelength of the light illuminating the fiber optic material in surface 18, different colors may be visible on surface 18 in different areas as desired. Additionally, it should be readily apparent that the line markings and other indications may be selectively shown in different colors, widths or brightness by changing the connections between light sources and optical material without physically altering surface 18.

The invention is also directed toward a method of manufacturing and installing surfacing which may be marked optically. Such surfacing may be manufactured at a number of different stages.

The optical material may be threaded, knitted, tufted, sewn, stitched, punched or woven directly into the turf system when the primary backing layer of the artificial turf is being formed. This method may be used when manufacturing any of the types of artificial turf systems discussed above. Alternatively, fiber optic material may be threaded, knitted, tufted, sewn, stitched, punched, woven or otherwise positioned into the turf system after the primary backing layer has been formed. Alternatively, preexisting synthetic turf surfaces may be partly or wholly cut-out along the area to be marked and fiber optic material threaded or knitted through the turf as discussed above. The use of the term "threading" in the claims is meant to include knitting, tufting, sewing, stitching, punching, inserting, weaving, impregnating, or otherwise positioning the optical material in the turf system when the turf is initially manufactured or after the turf has been initially manufactured. These methods maybe used not only with artificial synthetic turf systems, but also with other systems such as the in-filled or hybrid surfaces discussed above.

In forming non-turf surfacing, fiber optic material may be threaded through a suitable base layer or subbase layer depending on the application. If the playing surface is one of which is initially poured in a liquid form and then hardens, fiber optic filaments may be held in appropriate positions while the playing surface is poured around them. The playing surface layer may then be allowed to harden and the fiber optic filaments may be trimmed to lie flush with the top of the hardened playing surface. The term "trimming" in the claims is meant to include cutting, trimming, shortening or otherwise adjusting the optical material so that it is flush with the surrounding surface.

Alternatively, the surface may be formed such that hollow conduits for the fiber optic material are placed in the surface and the fiber optic material is then threaded through the pre-formed conduits such that light is visible from above the surface when the surface is in place and the material is illuminated. Once the surfacing is installed, the fiber optic material extending through or below the surface may be optically connected to a light source.

Modifications

The present invention contemplates that many changes and modifications may be made. Various types of surfacing may be employed. For turf surfacing, the type of turf systems may be readily altered, including the exact composition or formation of the turf systems and supporting layers. The optical material should convey light and allow for at least partial illumination of at least a portion of the material. The specific types of optical material and the number, shape, length, brightness, density, color, composition, cross-section, branches, conductivity and malleability of the material may be readily altered. The amount of area to be marked as well as the communication between light source(s) and optical material may be readily modified to alter color, visibility, timing, markings and other characteristics. The types of markings are not deemed critical and may include lines, advertising, letters, logos, emblems, shapes etc. Therefore, while presently-preferred forms of the optically marked surface and methods associated therewith have been shown and described, and several modifications discussed, persons skilled in the art will readily appreciate that various additions changes and modifications may be made without departing from the spirit of the invention, as defined and differentiated by the following claims.

What is claimed is:

1. A method of marking a surface, comprising the steps of:

providing a light source;

providing a playing surface to be marked having a backing artificial turf fibers and optical material capable of illumination by said light source;

providing a base supporting said surface to be marked;

configuring and arranging said turf fibers, said optical material, said backing and said light source such that said turf fibers and said optical material extend from said backing and illumination of said optical material is visible on said surface; and illuminating said optical material with said light source.

2. A method of manufacturing artificial turf comprising the steps of:

providing a primary backing layer;

providing artificial fibers;

providing fiber optical material;

threading said artificial fibers through said primary backing layer such that they extend from said backing layer;

threading said fiber optical material through said primary backing layer and between said artificial fibers.

3. The method of manufacturing artificial turf set forth in claim 2, wherein said primary backing layer is oriented in a first direction and wherein said artificial fibers are oriented in a direction substantially transverse to said first direction.

4. A method of manufacturing turf comprising the steps of providing a turf surface having turf fibers extending from a backing, providing optical material capable of illumination by a light source, and threading said optical material in said turf surface, whereby illumination of said optical material is visible on said surface.

5. The method of manufacturing turf set forth in claim 4, wherein said optical material is threaded in said turf surface when said turf surface is being initially manufactured.

6. The method of manufacturing turf set forth in claim 4, wherein said optical material is threaded in said turf surface after said turf surface has been placed as surfacing for a playing surface.

* * * * *